United States Patent [19]

Leonard et al.

[11] Patent Number: 5,630,613
[45] Date of Patent: May 20, 1997

[54] APPARATUS FOR AIDING IN THE OPENING OF AN INTEGRAL DEPLOYMENT DOOR IN A PANEL OF AN AIRBAG ASSEMBLY

[75] Inventors: Timothy J. Leonard, Stuttgart, Germany; Joseph L. Ralston; Donald J. Bolieau, both of North Ogden, Utah; Mark Rogers, Roy, Utah; Daniel W. Anderson, South Weber, Utah; Axel W. Kaiser, Vaihingen, Germany

[73] Assignees: Morton International, Inc., Chicago, Ill.; Robert Bosch GmbH, Stuttgart-Feuerbach, Germany

[21] Appl. No.: 543,845

[22] Filed: Oct. 23, 1995

[51] Int. Cl.⁶ .................................................. B60R 21/16
[52] U.S. Cl. .................................... 280/728.3; 280/732
[58] Field of Search ............................ 280/728.3, 732, 280/728.1, 731

[56] References Cited

U.S. PATENT DOCUMENTS

| | | | |
|---|---|---|---|
| 3,799,576 | 3/1974 | Fiala | 280/150 AB |
| 3,837,669 | 9/1974 | Nagazumi et al. | 280/150 AB |
| 4,097,064 | 6/1978 | Ikawa et al. | 280/732 |
| 4,989,896 | 2/1991 | DiSalvo et al. | 280/732 |
| 5,035,444 | 7/1991 | Carter | 280/732 |
| 5,046,758 | 9/1991 | Rafferty et al. | 280/732 |
| 5,060,971 | 10/1991 | Nanbu et al. | 280/728 |
| 5,082,310 | 1/1992 | Bauer | 280/732 |
| 5,108,128 | 4/1992 | Parker et al. | 280/732 |
| 5,154,444 | 10/1992 | Nelson | 280/732 |
| 5,161,819 | 11/1992 | Rhodes, Jr. | 280/728 |
| 5,277,443 | 1/1994 | Grant et al. | 280/732 |
| 5,280,947 | 1/1994 | Cooper | 280/728 B |
| 5,292,151 | 3/1994 | Parker | 280/728 B |
| 5,316,335 | 5/1994 | Gray et al. | 280/728 B |
| 5,320,380 | 6/1994 | Hamada et al. | 280/728.3 |
| 5,362,096 | 11/1994 | Satoh et al. | 280/732 |
| 5,407,225 | 4/1995 | Cooper | 280/732 |
| 5,421,608 | 6/1995 | Parker et al. | 280/732 |
| 5,433,473 | 7/1995 | Hiramitsu et al. | 280/728.3 |
| 5,447,328 | 9/1995 | Iannazzi et al. | 280/732 |
| 5,466,000 | 11/1995 | Leonard et al. | 280/732 |
| 5,533,748 | 7/1996 | Wirt et al. | 280/728.3 |

*Primary Examiner*—Eric D. Culbreth
*Attorney, Agent, or Firm*—George W. Rauchfuss, Jr.

[57] ABSTRACT

An integral deployment door in a panel of an airbag assembly which covers and conceals an airbag module. The molded panel having a front surface layer, a foam core, and a rear surface substrate has notches therein in alignment with the proposed tear region or sides of the deployment door. Tabs are provided which extend upwardly into the foam core along the sides of said deployment door and in alignment with the notches. The notches and tab construction weaken the tear region and concentrates the stresses along the sides of the deployment door to reduce the force required to open the deployment door and to reduce the fragmentation of the foam core due to the separation of the door from the rest of the panel.

8 Claims, 2 Drawing Sheets

FIG. 1
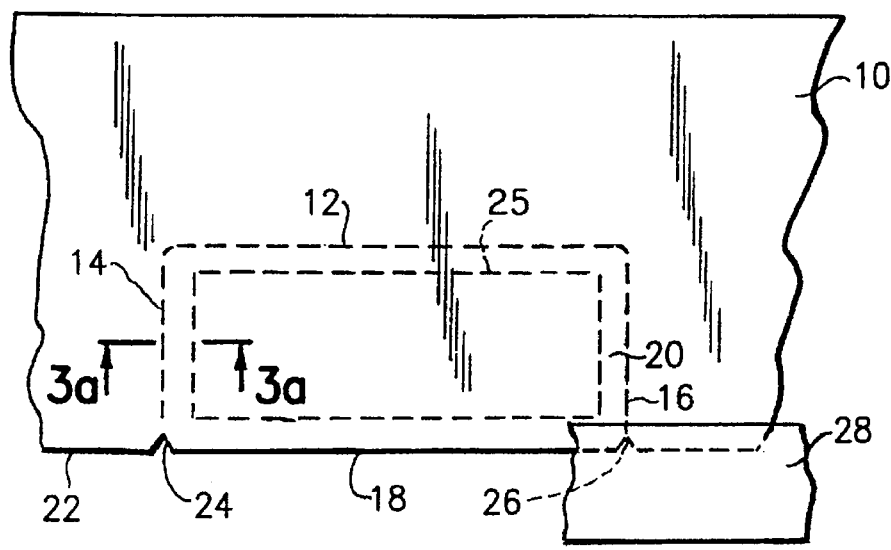
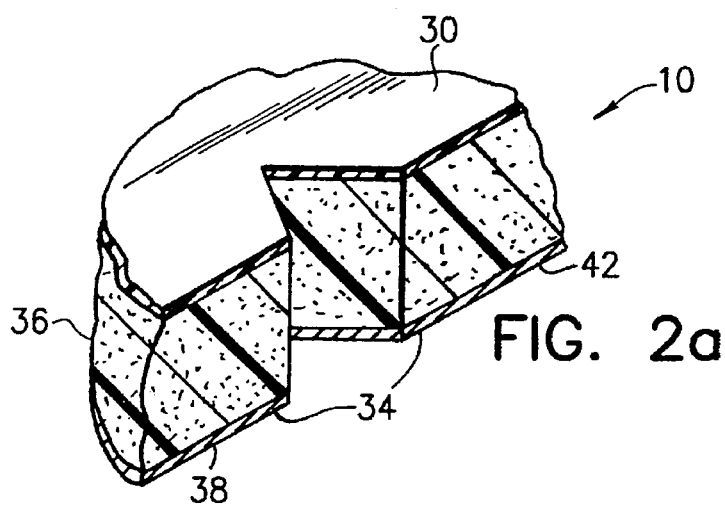
FIG. 2a
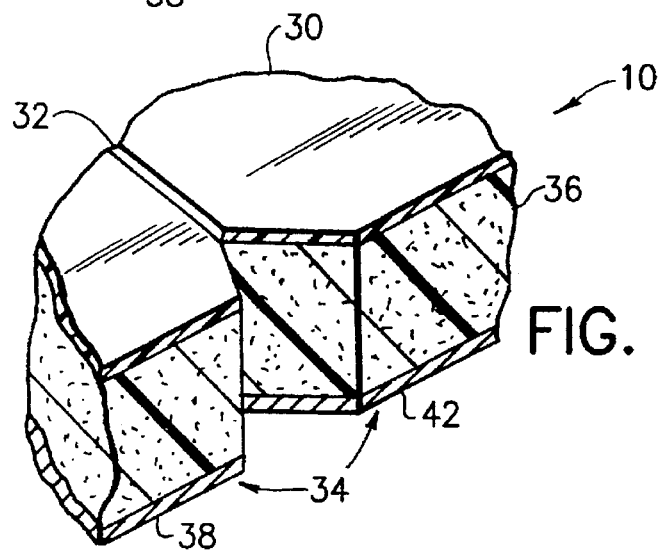
FIG. 2b 5,630,613

APPARATUS FOR AIDING IN THE OPENING OF AN INTEGRAL DEPLOYMENT DOOR IN A PANEL OF AN AIRBAG ASSEMBLY

FIELD OF THE INVENTION

This invention relates to a motor vehicle airbag assembly, and more particularly, to the opening of a deployment door covering and concealing the airbag assembly which is integral with a panel of the vehicle.

BACKGROUND OF THE INVENTION

Airbag restraint systems are generally provided with some type of cover assembly which conceals the airbag system in an internal portion of a vehicle, e.g., in the passenger instrument panel, prior to the deployment of an airbag into the vehicle passenger compartment. Some airbag systems cover assemblies comprise a panel containing an integral deployment door, which is caused to open during the inflation of the hidden airbag, thereby providing a doorway outlet in the panel through which the inflating airbag deploys into the vehicle passenger compartment. The panel normally includes tear regions along the boundaries of the door which integrally joins the deployment door with the remaining areas of the panel. The panel in which the deployment door is contained is normally multilayered, comprising a decorative vinyl outer layer or "skin" separated by a foam core or "padding" from a metal or thermoplastic panel substrate.

In order to cause the deployment door to open, a tear means is generally aligned with the tear region which may include tear seams. The inflating force of the deploying airbag drives the tear means through the tear region to separate the deployment door from the rest of the panel. The deployment door is hinged along one side thereof or tethered to an interior vehicle substrate to prevent the release of the door into the passenger compartment to prevent injury to vehicle occupants.

Since the deploying airbag generates the force for opening the deployment door, the less force required in opening the deployment door, the better. Accordingly, a better definition of the tear region without creating a visible seam in the panel and/or limiting of fragmentation on opening the deployment door would enhance system performance.

SUMMARY OF THE INVENTION

Accordingly, it is an object of this invention to provide a new and improved apparatus for concentrating stresses in delineating and opening the deployment door in an integral panel of an airbag assembly which reduces the force required to open the deployment door and limits the fragmentation caused by the opening of the deployment door.

In carrying out this invention in one illustrative embodiment thereof, a vehicle panel assembly is provided having an integral airbag deployment door defined in a portion of said panel for deployment of an airbag from an airbag module positioned behind said panel and deployment door which panel assembly comprises a panel front surface for facing an interior of a vehicle compartment, a panel rear surface substrate, and a foam core between said front surface and said rear surface substrate. The deployment door is hinged in said panel along a first side of said door and a pair of spaced notches are provided in said panel on a second side of said door parallel with and opposite to said first side for delineating the ends of the second side of said door whereby the deployment door opens at said notches. Tear means may be aligned with said notches with or without tear seams to define the remaining sides of the deployment door.

BRIEF DESCRIPTION OF THE DRAWINGS

The invention together with other objects, features, aspects and advantages thereof will be more clearly understood from the following description taken in connection with the accompanying drawings in which like elements will bear the same reference numerals throughout the various views.

FIG. 1 is a diagrammatic top view of a panel assembly having an integral deployment door in phantom partly defined by notches in accordance with the present invention and illustrating an airbag module in phantom behind the door;

FIG. 2a is a partial bottom view in perspective of the bottom of the panel as shown in FIG. 1 with the skin removed illustrating the notch construction of the panel in accordance with the present invention;

FIG. 2b is similar to FIG. 2a showing an alternative panel construction using a tear seam to aid in the delineation of the deployment door in the panel;

FIG. 3b is similar to FIG. 3a illustrating the addition of a tear seam to the structure of FIG. 3a.

DESCRIPTION OF THE PREFERRED EMBODIMENTS

Figure 3A:
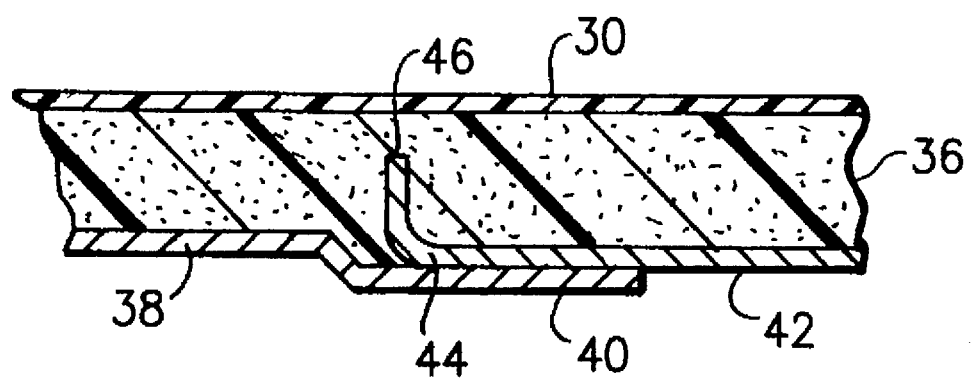
FIG. 3a is a cross-sectional view taken along line 3a in FIG. 1.

Referring now to FIG. 1, a molded panel 10 has an integral deployment door 20 therein which is delineated by hinged side 12, parallel sides 14 and 16, and front edge 18 opposite hinged side 12. Front edge or side 18 also constitutes part of the front or bottom edge 22 of the panel 10. The hinge 12 is conventional and functions to retain the deployment door 20 on the panel 10 upon deployment. The sides 14 and 16 of the deployment door 20 are further defined by notches 24 and 26, respectively, on the edge 22 of the panel 10. The notches 24 and 26 function to initiate the tearing along deployment door sides 14 and 16, as will be explained further hereinafter. As will be seen in FIG. 1 with respect to notch 26, the notches 24 and 26 may be provided with a cover or panel 28 overlying the door edge or side 18. The panel 10 will normally be contoured in accordance with the interior of the vehicle in which it is installed so the cover or panel 28 will overlie and conceal the notches 24 and 26. Only a portion of the cover 28 is shown in FIG. 1 covering notch 26; it being understood that cover 28 would extend so as to also cover notch 24.

The panel 10 and deployment door 20 overlie and conceal an airbag module 25. The deployment door 20 is adapted to be opened by an inflating airbag from the airbag module 25.

Referring now to FIGS. 2a and 2b, the molded panel 10 comprises a front surface layer 30 which is provided with a tear seam 32 as illustrated in FIG. 2b or without a tear seam as illustrated in FIG. 2a and a rear surface substrate 34 with a plastic foam layer or core 36 sandwiched between the front surface layer 30 and the rear surface substrate 34. The type of materials used in forming the panel do not in themselves constitute part of the present invention, and any material suitable for forming such a panel may be used. For example, the front surface layer 30, generally referred as the "skin," may be a vinyl material, and core 36 may be a plastic foam. The rear substrate 34, which may comprise the panel substrate 38 and the door substrate 42, may be made of thermoplastic and/or metal.

Figure 3B:
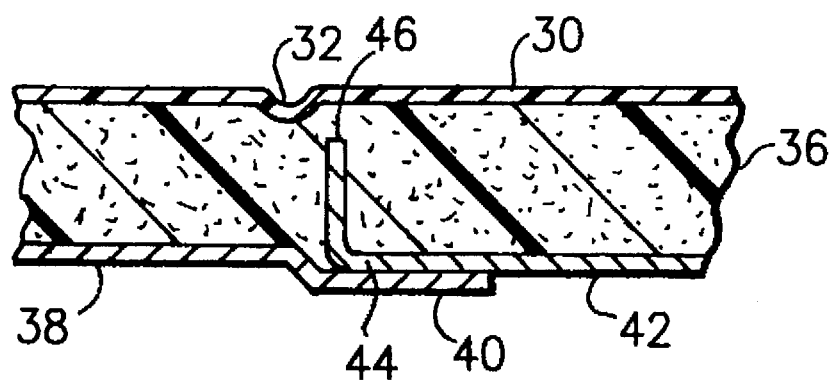

The rear surface substrate 34 of the panel 10 is formed by a combination of the instrument panel substrate 38, which may have a dropped shelf 40 extending therefrom on which the distal end 44 of the door substrate 42 rests (see FIGS. 3a and 3b).

As will be seen in FIGS. 3a and 3b, the opening of the deployment door 20 is aided by a cutter means in the form of an upstanding tab 46 which extends outwardly from the distal end 44 of the door substrate 42 into the foam core 36 toward the front surface layer 30. The tab 46 is used to reduce the amount of foam core 36 that must be cut or torn in order to open the deployment door 20. The amount of foam core 36 to be torn or cut is reduced by the embodiment of FIG. 3b which provides a tear seam 32, thus shortening the distance and accordingly, the amount of foam core between the end of the tab 46 and the tear seam. The tab 46 also defines the separation lines for sides 14 and 16 of the deployment door 20. The shortened distance between the tab 46 and the front surface layer 30 or tear seam 32 may also reduce fragmentation of the foam core, and accordingly the debris emitted on the opening of the deployment door 20.

The opening of the deployment door which results from the deployment of an inflating airbag from the airbag module 25 positioned behind the panel 10 and door 20 is enhanced in the present invention by the notches 24 and 26 which reduce the breakout pressure along the sides 14 and 16, respectively of the deployment door 20. Stresses are concentrated by the notches at the proposed tear location of sides 14 and 16, thereby reducing the required door breakout pressure. Accordingly, less force and fragmentation are achieved in a very simple and inexpensive manner.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. A vehicle panel assembly having a contoured panel and a single integral airbag deployment door defined in a portion of said contoured panel for deployment of an airbag from an airbag module positioned behind said contoured panel and deployment door, said panel assembly comprising:

a panel front surface for facing an interior of a vehicle compartment and having a front edge, a panel rear surface substrate, a foam core between said panel front surface and said panel rear surface substrate, said integral deployment door having the same contour as said panel and being hinged in said panel assembly in a hinge region along a first side of said door with said front edge of said panel comprising a second side of deployment door, a pair of spaced notches in said front edge of said panel assembly on said second side of said deployment door opposite the hinged region of the first side of said door for delineating the ends of the second side of said door and for concentrating stresses and initiating separation of said deployment door from said panel assembly in only two tear regions from said notches to said hinge region of said door to define the remaining sides of said door.

2. The panel assembly as claimed in claim 1 wherein tear seams are provided in alignment with said notches for aiding in defining said two tear regions of said deployment door.

3. The panel assembly as claimed in claim 1 having tabs positioned on said panel rear surface substrate and extending into said foam core toward said panel front surface in said two regions for further defining the tear regions.

4. The panel assembly as claimed in claim 3 having a pair of parallel tear seams in panel assembly in alignment with said notches.

5. The panel assembly as claimed in claim 3 wherein said panel rear surface substrate has a dropped shelf extending therefrom underlying said tabs along said two tear regions, and said deployment door in said panel assembly being positioned on said dropped shelf on said panel rear surface substrate whereby said deployment door is on the same level as an adjacent portion of said panel.

6. The panel assembly as claimed in claim 1 wherein said panel rear surface substrate has a dropped shelf extending therefrom underlying said two tear regions from said notches in said tear region to said hinge region of said door, and said deployment door in said panel assembly being positioned on said dropped shelf whereby said deployment door is on the same level as an adjacent portion of said panel.

7. A vehicle panel assembly having a contoured panel and a single integral airbag deployment door defined in a portion of said contoured panel for deployment of an airbag from an airbag module positioned behind said contoured panel and deployment door, said panel assembly comprising:

a panel front surface for facing an interior of a vehicle compartment and having a front edge, a panel rear surface substrate having a dropped shelf extending therefrom, a foam core between said panel front surface and said panel rear surface substrate, said integral deployment door having the same contour as said panel and being hinged in said panel assembly along a first side of said door with said front edge of said panel comprising a second side of said door, a pair of spaced notches in said front edge of said panel assembly on said second side of said door opposite the hinged side of said door for delineating the ends of the second side of said door, a pair of generally parallel tabs positioned on said dropped shelf of said panel rear surface substrate and extending into said foam core toward said panel front surface in alignment with said notches, said tabs extending along lines from said notches to said first side of said door, thereby forming with said notches only two tear regions whereby said notches concentrate stresses and initiate separation of said deployment door from said panel along only said two tear regions to define the remaining sides of said door.

8. The vehicle panel assembly as claimed in claim 7 having a pair of parallel tear seams in said panel assembly substantially in alignment with said notches.

* * * * *